US010835427B2

(12) United States Patent
Tang et al.

(10) Patent No.: US 10,835,427 B2
(45) Date of Patent: Nov. 17, 2020

(54) ELEVATING BED AND METHOD FOR DETECTING BRAKING PERFORMANCE OF ELEVATING BED

(71) Applicant: General Electric Company, Schenectady, NY (US)

(72) Inventors: Zhenjiang Tang, Beijing (CN); Wei Zhou, Beijing (CN)

(73) Assignee: General Electric Company, Schenectady, NY (US)

( * ) Notice: Subject to any disclaimer, the term of this patent is extended or adjusted under 35 U.S.C. 154(b) by 386 days.

(21) Appl. No.: 15/683,902

(22) Filed: Aug. 23, 2017

(65) Prior Publication Data

US 2018/0055701 A1  Mar. 1, 2018

(30) Foreign Application Priority Data

Aug. 31, 2016  (CN) ...................... 2016 2 1017595 U

(51) Int. Cl.

| A61G 1/02 | (2006.01) |
|---|---|
| A61G 13/02 | (2006.01) |
| A61G 1/04 | (2006.01) |
| A61G 1/056 | (2006.01) |
| A61G 7/018 | (2006.01) |
| A61G 13/06 | (2006.01) |

(Continued)

(52) U.S. Cl.
CPC ............ *A61G 1/0287* (2013.01); *A61G 1/042* (2016.11); *A61G 1/0567* (2013.01); *A61G 7/018* (2013.01); *A61G 13/02* (2013.01); *A47C 31/00* (2013.01); *A61G 13/06* (2013.01); *A61G 2203/10* (2013.01); *A61G 2203/38* (2013.01); *G01P 15/00* (2013.01)

(58) Field of Classification Search
CPC ...... A61G 1/0287; A61G 13/02; A61G 7/018; A61G 1/0567; A61G 1/042; A61G 2203/38; A61G 13/06; A61G 2203/10; A61G 5/0858; G01P 15/00; A47C 31/00; A61B 6/4092

See application file for complete search history.

(56) References Cited

U.S. PATENT DOCUMENTS 3,974,676 A * 8/1976 Eaton ..................... B21D 5/004
                                                         72/307
4,206,620 A * 6/1980 Eaton ....................... B21D 7/12
                                                         414/431

(Continued)

*Primary Examiner* — Myles A Throop

(57) ABSTRACT

An elevating bed capable of detecting braking performance includes an elevating assembly, a driving motor connected to the elevating assembly and driving the elevating assembly to move, a brake device connected to the driving motor, a control module connected to the driving motor and to the brake device. When the control module disables the brake device, the control module controls the driving motor to drive the elevating assembly to move for a first movement distance and calculates a first torque value of the driving motor. When the control module enables the brake device, the control module controls the driving motor to drive the elevating assembly to move for a second movement distance and calculates a second torque value of the driving motor. The control module determines whether the brake device is normal or abnormal according to a relationship between the first torque value and the second torque value.

14 Claims, 2 Drawing Sheets

(51) Int. Cl.
*A47C 31/00* (2006.01)
*G01P 15/00* (2006.01)

(56) References Cited

U.S. PATENT DOCUMENTS

| | | | | |
|---|---|---|---|---|
| 4,790,606 A | * | 12/1988 | Reinecke | B60T 8/00 188/1.11 E |
| 4,852,434 A | * | 8/1989 | Bald | B23B 23/00 82/118 |
| 2008/0301872 A1 | * | 12/2008 | Fahrig | A61B 6/0457 5/81.1 R |
| 2009/0105924 A1 | * | 4/2009 | Kamichi | B60L 50/16 701/99 |
| 2014/0325759 A1 | * | 11/2014 | Bly | A61G 7/002 5/611 |
| 2015/0222207 A1 | * | 8/2015 | Matsushita | B66F 9/02 318/376 |
| 2016/0089283 A1 | * | 3/2016 | DeLuca | A61G 1/0243 180/413 |
| 2016/0331146 A1 | * | 11/2016 | Ray | A47C 19/045 |
| 2019/0240094 A1 | * | 8/2019 | Furman | A61G 7/018 |

\* cited by examiner

ELEVATING BED AND METHOD FOR DETECTING BRAKING PERFORMANCE OF ELEVATING BED

CROSS-REFERENCE TO RELATED APPLICATIONS

This application claims priority to China patent application number 201621017595.2, filed on Aug. 31, 2016, the entirety of which is incorporated herein by reference.

FIELD

The present invention relates to an elevating bed, particularly to an elevating bed in medical equipments and a method for detecting braking performance of an elevating bed.

BACKGROUND

Various types of elevating beds are included in medical equipments, e.g., an examination bed used for supporting a patient during detections of MR, CT, PET-CT, linear accelerator and the like. In practical use, the patient lies on a bed board, and the elevation of the bed t is driven by an elevating assembly. To further control the elevation and protect the patient to be safe, the elevating beds in medical equipments are all equipped with brake devices.

In the stage of installation of an elevating bed, after the brake device is regulated by an installation engineer, the elevating bed is delivered to the hospital for use. As the equipment is used and worn, the performance of the brake device will gradually become worse, until failure in the end. However, in the current use, until failure of the brake, can the doctor find it and notify the maintenance engineer to come for checking and repairing, which not only has hidden danger, but also delays the equipment from normal operation.

Therefore, it is necessary to propose an elevating bed that can detect braking performance.

SUMMARY

The present invention provides an elevating bed. The elevating bed comprises: an elevating assembly; a driving motor connected to the elevating assembly and driving the elevating assembly to move; a brake device connected to the driving motor; and a control module connected to the driving motor and controlling the driving motor to rotate, and connected to the brake device and controlling the brake device to be enabled or disabled; when the control module disables the brake device, the control module controls the driving motor to drive the elevating assembly to move for a first movement distance and calculates a first torque value of the driving motor; when the control module enables the brake device, the control module controls the driving motor to drive the elevating assembly to move for a second movement distance and calculates a second torque value of the driving motor, the control module determining whether the brake device is normal or abnormal according to a relationship between the first torque value and the second torque value.

Preferably, the elevating bed further comprises a torque sensor to monitor torques of the driving motor, the control module reading the torque values through the torque sensor.

Preferably, the first torque value is a mean value of the torques monitored by the torque sensor when the elevating assembly is moving within the first movement distance, and the second torque value is a mean value of the torque values monitored by the torque sensor when the elevating assembly is moving within the second movement distance.

Preferably, the control module is used for calculating a ratio of the second torque value to the first torque value to obtain a torque ratio; when the torque ratio is greater than or equal to a first threshold, the control module determines that the brake device is normal, otherwise, the control module determines that the brake device is abnormal.

Preferably, the first threshold is pre-stored in the control module.

Preferably, the elevating assembly comprises a pushrod and a scissor fork component, and the driving motor is connected to the pushrod and drives the pushrod to control the scissor fork component to rise and fall.

Preferably, the control module outputs an alert signal when the control module determines that the brake device is abnormal.

Preferably, when the first torque value is less than or equal to a second threshold and the second torque value is greater than or equal to a third threshold, the control module determines that the brake device is normal, otherwise the control module determines that the brake device is abnormal.

Preferably, the control module is used to acquire and store a plurality of the first torque values and a plurality of the corresponding second torque values at intervals, and the control module determines whether the brake device is normal or abnormal according to changes of the currently acquired first torque value and second torque value with respect to the previously acquired first torque value and second torque value respectively.

Preferably, the control module is electrically connected to a communication module, and the control module is used to receive a command signal through the communication module and controls the driving motor and the brake device according to the command signal to determine whether the brake device is normal or abnormal.

The present invention also provides a method for detecting braking performance of an elevating bed, the method comprising the following steps: Step 1: disabling the brake device, controlling the driving motor to drive the elevating assembly to move for a first movement distance; Step 2: enabling the brake device, controlling the driving motor to drive the elevating assembly to move for a second movement distance; Step 3: calculating a first torque value of the driving motor when the elevating assembly is moving within the first movement distance; Step 4: calculating a second torque value of the driving motor when the elevating assembly is moving within the second movement distance; and Step 5: determining whether the brake device is normal or abnormal according to a relationship between the first torque value and the second torque value.

Preferably, before Step 3, the method further comprises: reading torques of the driving motor from a torque sensor for monitoring the driving motor.

Preferably, in Step 3, the first torque value is a mean value of the torques read from the torque sensor when the elevating assembly is moving within the first movement distance. In Step 4, the second torque value is a mean value of the torques read from the torque sensor when the elevating assembly is moving within the second movement distance.

Preferably, Step 5 may comprise: calculating a ratio of the second torque value to the first torque value to obtain a torque ratio; when the torque ratio is greater than or equal to a first threshold, determining that the brake device is normal, otherwise, determining that the brake device is abnormal.

Preferably, Step 5 may comprise: when the first torque value is less than or equal to a second threshold and the second torque value is greater than or equal to a third threshold, determining that the brake device is normal, otherwise determining that the brake device is abnormal.

Preferably, before Step 5, the method may further comprise: performing Step 1 to Step 4 a plurality of times to acquire a plurality of first torque values and a plurality of second torque values, and Step 5 may comprise: determining whether the brake device is normal or abnormal according to changes of the currently acquired first torque value and second torque value with respect to the previously acquired first torque value and second torque value respectively.

Preferably, the method for detecting braking performance of an elevating bed of the present embodiment may further comprise: outputting an alert signal when determining that the brake device is abnormal.

Preferably, before Step 1, the method may further comprise: receiving a command signal to determine the braking performance of the elevating bed.

Other features and aspects will be apparent through the following detailed description, figures and claims.

BRIEF DESCRIPTION OF THE DRAWINGS

The present invention can be understood better in light of the description of exemplary embodiments of the present invention with reference to the accompanying drawings, in which.

DETAILED DESCRIPTION

Hereafter, a detailed description will be given for preferred embodiments of the present disclosure. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical means in the art for those of ordinary skilled in the art associated with the contents disclosed in the present disclosure, which should not be regarded as insufficient disclosure of the present disclosure.

Unless defined otherwise, all the technical or scientific terms used in the Claims and the Description should have the same meanings as commonly understood by one of ordinary skilled in the art to which the present disclosure belongs. The terms "first", "second" and the like in the Description and the Claims of the present invention do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" covers the elements or objects and their equivalents illustrated following the "comprises", "comprising", "includes" and "including", but do not exclude other elements or objects. The term "coupled" or "connected" or the like is not limited to being connected physically or mechanically, nor limited to being connected directly or indirectly.

Figure 1:
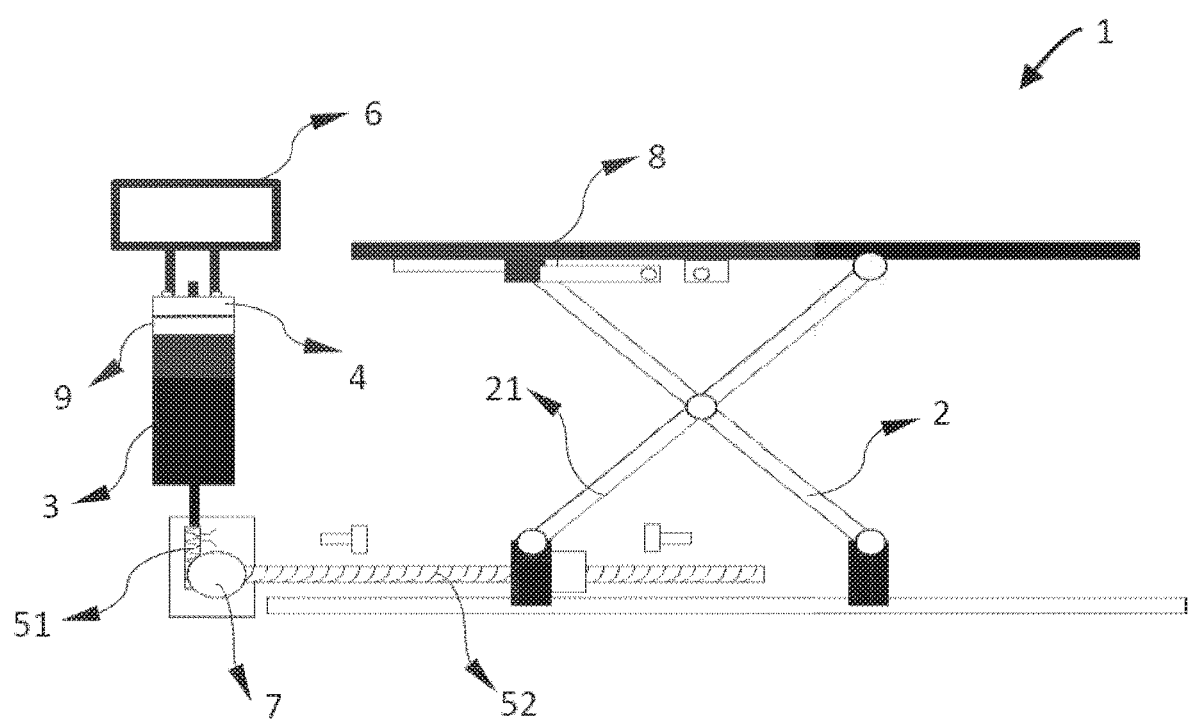
FIG. 1 illustrates a structural schematic diagram of one embodiment of an elevating bed of the present invention.

FIG. 1 illustrates a structural schematic diagram of one embodiment of an elevating bed of the present invention. The elevating bed 1 includes an elevating assembly 2, a driving motor 3, a brake device 4 and a control module 6.

The driving motor 3 is connected to the elevating assembly 2 and drives the elevating assembly 2 to move. The control module 6 is connected to the driving motor 3 and controls the driving motor 3 to rotate. In one embodiment, the elevating assembly 2 may include a pushrod 52 and a scissor fork component 21 connected to the pushrod 52, and the driving motor 3 is connected to and drives the pushrod 52 to control the scissor fork component 21 to move up and down. Furthermore, the driving motor 3 may be connected to and drive the elevating assembly 2 by a transmission component as shown in FIG. 1 including a worm 51 and a worm gear 7 engaged with the worm 51, where the worm gear 7 may be connected to the pushrod 52 of the elevating assembly 2. Specifically, the control module issues a control command to the driving motor 3, so that the driving motor 3 drives the worm 51 to rotate, so as to transmit the power of the driving motor 3 to the pushrod 52 via the worm gear 7 and drive the elevating assembly 2 to move up and down. The pushrod 52 may specifically be a screw.

The elevating assembly 2 described above may be used to raise or lower a bed surface 8 connected to the elevating assembly 2 during the process of elevation, while the structure of the elevating assembly 2 and the structure of connection between the elevating assembly 2 and the driving motor 3 may also be other structures.

The brake device 4 is connected to the driving motor 3, and the control module 6 is also connected to the brake device 4 and may control the brake device 4 to be enabled or disabled, in order to control the driving motor 3 to drive deceleration of the elevating assembly 2, to achieve braking function.

Optionally, the elevating bed 1 may further include a torque sensor 9 that can monitor torques of the driving motor 3, and the control module 6 can read the torques of the driving motor 3 from the torque sensor 9 in real time. In other embodiments, the control module 6 may monitor the parameters of the driving motor 3 such as current and the like to calculate the torque of the driving motor 3.

Figure 2:
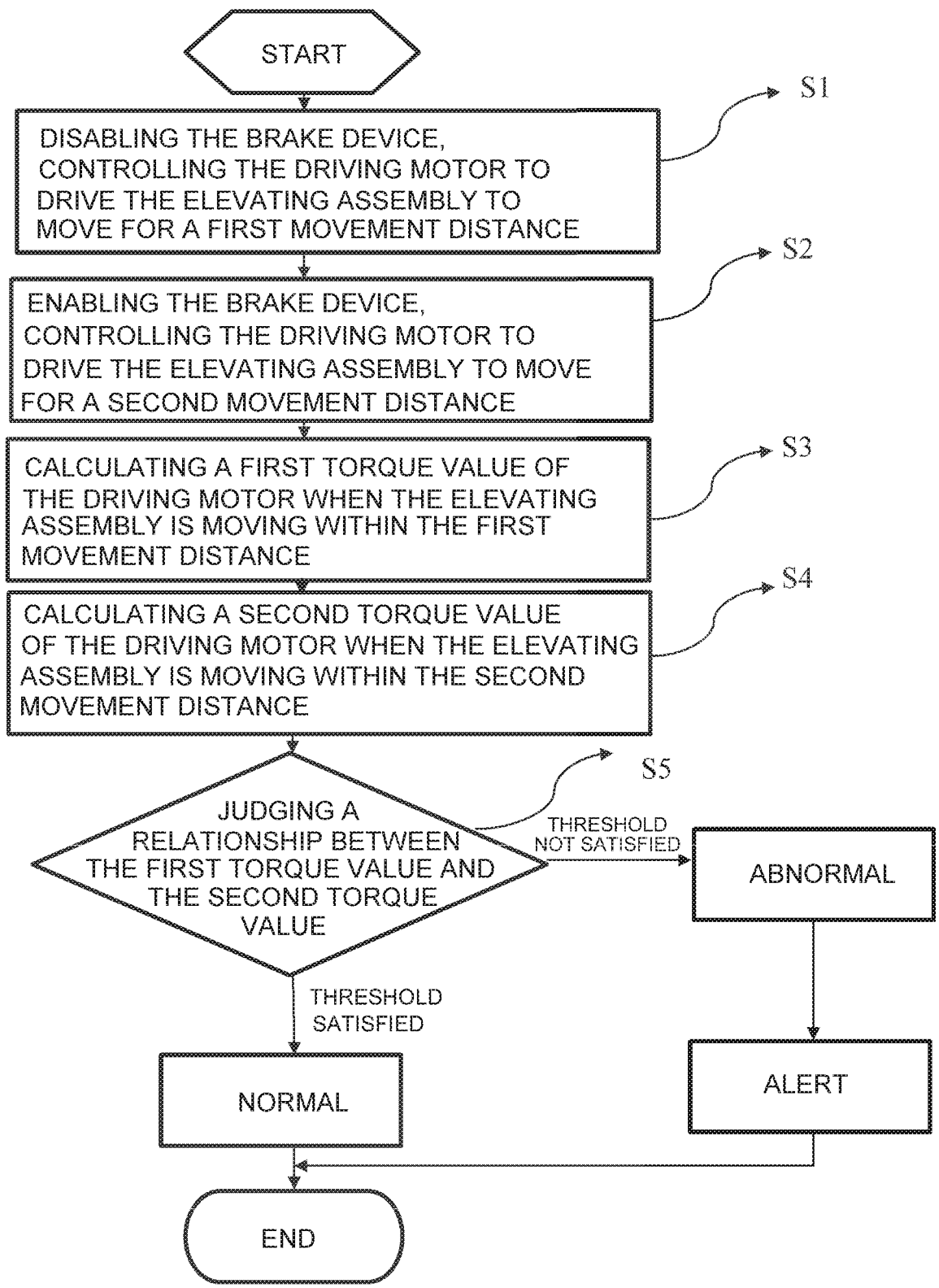
FIG. 2 exemplarily illustrates a flow chart of detecting braking performance of the above elevating bed.

FIG. 2 exemplarily illustrates a flow chart of detecting braking performance of the above elevating bed 1. First, Step S1 is carried out, in which the control module 6 disables the brake device 4, and controls the driving motor 3 to drive the elevating assembly 2 to move downward for a first movement distance, when the elevating assembly 2 stays at a certain starting position. The first movement distance is set depending on the type of the elevating bed, and in the present embodiment, the first movement distance may be set to be 20 cm. The control module 6 controls the elevating assembly 2 to fall, while in other embodiments the control module 6 may also control the elevating assembly 2 to rise for the first movement distance.

Thereafter, Step S2 is carried out, in which the control module 6 enables the brake device 4, and controls the driving motor 3 to drive the elevating assembly 2 to move downward for a second movement distance. The second movement distance is set depending on different types of elevating bed, and in the present embodiment, the second movement distance is 20 cm. In the present embodiment, the control module 6 controls the elevating assembly 2 to fall, while in other embodiments the control module 6 may also control the elevating assembly 2 to rise for the second movement distance.

The control module 6 may record the torque of the driving motor 3 during the process that the elevating assembly 2 is moving for the first movement distance or the second movement distance.

Step S3 may be carried out between Step S1 and Step S2, and may also be carried out after Step S2. In Step S3, the control module 6 calculates a first torque value of the driving motor after driving the elevating assembly 2 to move for the first movement distance. Optionally, the first torque value is a mean value of the torques of the driving motor 3 read from the torque sensor 9 when the elevating assembly 2 is moving within the first movement distance, that is, the mean value of the torques of the driving motor 3 recorded by the control module 6 during the process that the elevating assembly 2 is moving within the first movement distance.

Step S4 may be carried out after Step S2. In Step S4, the control module 6 calculates a second torque value of the driving motor 3 after driving the elevating assembly 2 to move for the second movement distance. Optionally, the second torque value is a mean value of the torques of the driving motor 3 read from the torque sensor 9 when the elevating assembly 2 is moving within the second movement distance, that is, the mean value of the torques of the driving motor 3 recorded by the control module 6 during the process that the elevating assembly 2 is moving within the second movement distance. Next, Step S5 is carried out, in which the control module 6 judges whether the brake device is normal or abnormal according to the relationship between the first torque value and the second torque value.

Specifically, in the present embodiment, the control module 6 is used to calculate a ratio of the second torque value to the first torque value to obtain a torque ratio. During the process that the elevating assembly 2 is moving for the first movement distance and moving for the second movement distance, the control module 6 reads a torque value every 36 millisecond (ms), and averages two groups of data in Steps S3 and S4 respectively to obtain the first torque value of 12.889 and the second torque value of 204.667. The control module 6 calculates the ratio of the second torque value to the first torque value to obtain the torque ratio of 15.879.

The control module 6 also pre-stores a first threshold therein, and the first threshold corresponding to the elevating bed of the present embodiment may be 10. The control module 6 is also used to compare the torque ratio with the first threshold. When the torque ratio is greater than or equal to the first threshold, the braking performance of the elevating bed is judged to be normal, that is, the brake device 4 is normal; otherwise, the braking performance of the elevating bed is judged to be abnormal, that is, the brake device 4 is abnormal.

A second threshold and a third threshold may also be stored in the control module 6, and in the present embodiment, the second threshold may be 20 and the third threshold may be 180. The control module 6 compares the first torque value with the second threshold. When the first torque value is less than or equal to the second threshold (e.g. 12.889<20) and the second torque value is greater than the third threshold (e.g. 204.667>180), the control module 6 judges that the braking performance of the elevating bed 1 is normal, that is, the brake device 4 is normal; otherwise, the control module 6 judges that the braking performance of the elevating bed 1 is abnormal, that is, the brake device 4 is abnormal.

In other embodiments, the standard of judgment may be varied, for example, only when the second torque value is greater than the third threshold and the torque ratio is greater than the first threshold, will the braking performance of the elevating bed 1 be judged to be normal. In short, as long as there is a sufficiently obvious difference between the second torque value and the first torque value (e.g. a difference of ten times or more), the control module 6 will judge that the braking performance is normal. Otherwise, the control module 6 judges abnormal.

Optionally, the control module 6 is also used to acquire and store a plurality of the first torque values and a plurality of the corresponding second torque values at intervals, and the control module 6 may judge whether the brake device is normal or abnormal according to changes of the currently acquired first torque value and second torque value with respect to the previously acquired first torque value and second torque value respectively. In some embodiments, the control module may update the threshold by itself during actual use. For example, every time when the control module judges normal, the first torque value, the second torque value and the toque ratio acquired this time are respectively averaged with the three thresholds of the last time, and the obtained results are updated as new second threshold, third threshold and first threshold. In the judgment of the next time, the new thresholds will be used. In this way, errors caused by daily wear and tear and equipment aging can be taken into account, which reduces a difference caused by equipment aging and the like, making the judgment more accurate.

The control module 6 outputs an alert signal when the control module 6 judges that the brake device is abnormal. The alert signal may be used to control an LED indicator, and may also be delivered to a user control interface directly, prompting a doctor or a nurse to contact a maintenance engineer for performing maintenance in advance.

For a certain type of elevating bed, its first threshold, second threshold and third threshold are all obtained through a plurality of experiments by designers according to specifications of components of the elevating bed. During designing, the designers can just perform experiments on threshold after determining the specification and performance of the components: first, add a certain load on the elevating bed to simulate a situation in which a patient is lying on the elevating bed; then, disable the brake device, and control the driving motor to drive the elevating assembly to move for a distance, the torque values being recorded continuously during the movement; next, enable the brake device, while controlling the driving motor to drive the elevating assembly to move for a distance, the torque values being recorded continuously during the movement.

Table 1 shows the changes of torque values when the brake device is enabled and disabled, where a load of 60 Kg is loaded on the elevating bed. When the brake device is disabled at the beginning, the driving motor drives the elevating assembly to move downward for 20 cm, and a torque value is sampled every 36 ms. From the recording result, the sampled torque value hardly changes during the movement of 20 cm, and the mean value of torque is calculated to be 7.889. After the brake device is enabled, the driving motor drives the elevating assembly to move downward for 20 cm, and likewise, a torque value is sampled every 36 ms. From the records, although there is some fluctuation in the sampled torque value, the torque value is relatively stable on the whole, and the mean value of torque after the brake device is enabled is calculated to be 210.375. The torque ratio of the two mean values of torque is calculated to be 26.667.

TABLE 1

| Status | Torque | Average Torque Value |
|---|---|---|
| Braking Disabled | 11 | 7.889 |
|  | 7 |  |
|  | 8 |  |
|  | 8 |  |
|  | 9 |  |
|  | 11 |  |
|  | 6 |  |
|  | 5 |  |
|  | 6 |  |
| Braking Enabled | 188 | 210.375 |
|  | 205 |  |
|  | 204 |  |
|  | 218 |  |
|  | 216 |  |
|  | 219 |  |
|  | 208 |  |
|  | 225 |  |

To simulate the actual situation realistically, the designers also make statistics on mean values of torque and torque ratios for different loads. In the present embodiment, the different loads are selected from 0 Kg to 225 Kg, with 20 Kg as an interval of the experiment loads. Table 2 records mean values of torque before and after the brake device is enabled under different loads, and Table 3 depicts torque ratios before and after the brake device is enabled under different loads.

TABLE 2

| Load Weight (kg) | Average Torque Value | |
|---|---|---|
|  | Braking Disabled | Braking Enabled |
| 225 | 16.167 | 215.556 |
| 200 | 15.444 | 206.889 |
| 180 | 15.778 | 214.125 |
| 160 | 13.778 | 203.000 |
| 140 | 12.889 | 204.667 |
| 120 | 11.556 | 207.667 |
| 100 | 9.887 | 207.500 |
| 80 | 9.222 | 207.625 |
| 60 | 7.889 | 210.375 |
| 40 | 6.667 | 204.625 |
| 20 | 5.889 | 208.500 |
| 0 | 5.000 | 207.125 |

As shown in Table 2, the mean values of torque are all less than 20 when the brake device is disabled under different loads, while the mean values of torque are all greater than 200 after the brake device is enabled, from which the first threshold is determined to be 20 and the second threshold is determined to be 200.

TABLE 3

| Load Weight (kg) | Torque Ratio |
|---|---|
| 225 | 13.333 |
| 200 | 13.396 |
| 180 | 13.571 |
| 160 | 14.734 |

TABLE 3-continued

| Load Weight (kg) | Torque Ratio |
|---|---|
| 140 | 15.879 |
| 120 | 17.970 |
| 100 | 20.987 |
| 80 | 22.514 |
| 60 | 26.667 |
| 40 | 30.692 |
| 20 | 35.405 |
| 0 | 41.425 |

From Table 3, it can be seen that the torques will have relative changes under different loads, but the actual values are all greater than 10. It should be noted that, the first threshold, second threshold and third threshold obtained in the present embodiment are actually all empirical values obtained based on simulation experiments. In specific designs, the designers may have some degree of freedom to make some minor adjustment to the thresholds based on experience, for example, the torque ratio may also be set to 12.

In some application situations, the control module 6 is also connected with a communication module (not shown in the figures) that can be connected to a workstation or a remote server in a wired or wireless manner. The control module 6 may receive a command signal through the communication module, and control the driving motor 3 and the brake device 4 according to the command signal to determine whether the brake device is normal or abnormal. The command signal can be a signal sent out by the above workstation or server. In this way, the after-sales service personnel can cooperate with the doctor remotely to perform on-line checking for the brake device, to improve the service efficiency and thus increase the utilization of the equipment.

According to the above description, the embodiments of the present invention may also provide a method for detecting braking performance of an elevating bed, for example, the method may be used to detect the braking performance of the elevating bed 1 in FIG. 1, and the method may comprise the following Step 1 to Step 5:

Step 1: disabling the brake device 4, controlling the driving motor 3 to drive the elevating assembly 2 to move for a first movement distance;

Step 2: enabling the brake device 4, controlling the driving motor 3 to drive the elevating assembly 2 to move for a second movement distance;

Step 3: calculating a first torque value of the driving motor 3 when the elevating assembly 2 is moving within the first movement distance;

Step 4: calculating a second torque value of the driving motor 3 when the elevating assembly 2 is moving within the second movement distance; and Step 5: determining whether the brake device is normal or abnormal according to a relationship between the first torque value and the second torque value.

Optionally, before Step 3, the method further comprises: reading torques of the driving motor from a torque sensor for monitoring the driving motor.

Optionally, in Step 3, the above first torque value is a mean value of the torques read from the torque sensor when the elevating assembly 2 is moving within the first movement distance. In Step 4, the second torque value is a mean value of the torques read from the torque sensor when the elevating assembly 2 is moving within the second movement distance.

Optionally, Step 5 may comprise: calculating a ratio of the second torque value to the first torque value to obtain a torque ratio; when the torque ratio is greater than or equal to a first threshold, determining that the brake device is normal, otherwise, determining that the brake device is abnormal.

Optionally, Step 5 may comprise: when the first torque value is less than or equal to a second threshold and the second torque value is greater than or equal to a third threshold, determining that the brake device is normal, otherwise, determining that the brake device is abnormal.

Optionally, before Step 5, the method may further comprise: performing Step 1 to Step 4 a plurality of times to acquire a plurality of first torque values and a plurality of second torque values, and Step 5 may comprise: determining whether the brake device is normal or abnormal according to changes of the currently acquired first torque value and second torque value with respect to the previously acquired first torque value and second torque value respectively.

Optionally, the method for detecting braking performance of an elevating bed of the present embodiment may further comprise: outputting an alert signal when determining that the brake device is abnormal.

Optionally, before Step 1, the method may further comprise: receiving a command signal to determine the braking performance of the elevating bed. The command signal to determine the braking performance of the elevating bed usually comes from an operating personnel. Thus, the operating personnel can detect the braking performance regularly, and notify a maintenance engineer in advance to come for checking and repairing when a risk of failure appears.

Some exemplary embodiments have been described in the above. However, it should be understood that various modifications may be made thereto. For example, if the described techniques are carried out in different orders, and/or if the components in the described system, architecture, apparatus or circuit are combined in different ways and/or replaced or supplemented by additional components or equivalents thereof, proper results may still be achieved. Accordingly, other implementation also falls within a protection range of the Claims.

We claim:

1. An elevating bed, comprising:
an elevating assembly;
a driving motor connected to the elevating assembly and driving the elevating assembly to move;
a brake device connected to the driving motor;
a control module connected to the driving motor and controlling the driving motor to rotate, and connected to the brake device and controlling the brake device to be enabled or disabled;
when the control module disables the brake device, the control module controls the driving motor to drive the elevating assembly to move for a first movement distance and calculates a first torque value of the driving motor; when the control module enables the brake device, the control module controls the driving motor to drive the elevating assembly to move for a second movement distance and calculates a second torque value of the driving motor, the control module determining whether the brake device is normal or abnormal according to a relationship between the first torque value and the second torque value;
wherein the elevating bed further comprises a torque sensor to monitor torques of the driving motor, the control module used for reading the torques of the driving motor from the torque sensor; and
wherein the first torque value is a mean value of the torques monitored by the torque sensor when the elevating assembly is moving within the first movement distance, and the second torque value is a mean value of the torques monitored by the torque sensor when the elevating assembly is moving within the second movement distance.

2. The elevating bed of claim 1, wherein the control module is used for calculating a ratio of the second torque value to the first torque value to obtain a torque ratio; when the torque ratio is greater than or equal to a first threshold, the control module determines that the brake device is normal, otherwise, the control module determines that the brake device is abnormal.

3. The elevating bed of claim 2, wherein the first threshold is pre-stored in the control module.

4. The elevating bed of claim 1, wherein the elevating assembly comprises a pushrod and a scissor fork component, the driving motor connected to the pushrod and driving the pushrod to control the scissor fork component to rise and fall.

5. The elevating bed of claim 1, wherein the control module outputs an alert signal when the control module determines that the brake device is abnormal.

6. The elevating bed of claim 1, wherein when the first torque value is less than or equal to a second threshold and the second torque value is greater than or equal to a third threshold, the control module determines that the brake device is normal, otherwise the control module determines that the brake device is abnormal.

7. The elevating bed of claim 1, wherein the control module is used to acquire and store a plurality of the first torque values and a plurality of the corresponding second torque values at intervals, the control module determines whether the brake device is normal or abnormal according to changes of the currently acquired first torque value and second torque value with respect to the previously acquired first torque value and second torque value respectively.

8. The elevating bed of anyone of claim 1, wherein the control module is electrically connected to a communication module, the control module used to receive a command signal through the communication module and controlling the driving motor and the brake device according to the command signal to determine whether the brake device is normal or abnormal.

9. A method for detecting braking performance of an elevating bed, the elevating bed comprising an elevating assembly, a driving motor and a brake device, the method comprising the following steps:
Step 1: disabling the brake device, controlling the driving motor to drive the elevating assembly to move for a first movement distance;
Step 2: enabling the brake device, controlling the driving motor to drive the elevating assembly to move for a second movement distance;
Step 3: calculating a first torque value of the driving motor when the elevating assembly is moving within the first movement distance;
Step 4: calculating a second torque value of the driving motor when the elevating assembly is moving within the second movement distance;
Step 5: determining whether the brake device is normal or abnormal according to a relationship between the first torque value and the second torque value;
wherein before the Step 3, the method further comprises reading torques of the driving motor from a torque sensor for monitoring the driving motor; and wherein the first torque value is a mean value of the torques read from the torque sensor when the elevating assembly is moving within the first movement distance, and the second torque value is a mean value of the torques read from the torque sensor when the elevating assembly is moving within the second movement distance.

10. The method for detecting braking performance of an elevating bed of claim 9, wherein the Step 5 comprises: calculating a ratio of the second torque value to the first torque value to obtain a torque ratio; when the torque ratio is greater than or equal to a first threshold, determining that the brake device is normal, otherwise, determining that the brake device is abnormal.

11. The method for detecting braking performance of an elevating bed of claim 9, wherein the Step 5 comprises: calculating a ratio of the second torque value to the first torque value to obtain a torque ratio; when the first torque value is less than or equal to a second threshold and the second torque value is greater than or equal to a third threshold, determining that the brake device is normal, otherwise determining that the brake device is abnormal.

12. The method for detecting braking performance of an elevating bed of claim 9, wherein the method comprises performing the Step 1 to the Step 4 a plurality of times to acquire a plurality of first torque values and a plurality of second torque values, the Step 5 comprising: determining whether the brake device is normal or abnormal according to changes of the currently acquired first torque value and second torque value with respect to the previously acquired first torque value and second torque value respectively.

13. The method for detecting braking performance of an elevating bed of claim 9, further comprising: outputting an alert signal when determining that the brake device is abnormal.

14. The method for detecting braking performance of an elevating bed of claim 9, before the Step 1, further comprising: receiving a command signal to determine the braking performance of the elevating bed.

* * * * *